(12) United States Patent
Provencher et al.

(10) Patent No.: US 9,569,480 B2
(45) Date of Patent: Feb. 14, 2017

(54) METHOD AND SYSTEM FOR STATEFUL RECOVERY AND SELF-HEALING

(71) Applicant: Aspen Technology, Inc., Burlington, MA (US)

(72) Inventors: Samuel D. Provencher, Waltham, MA (US); Ashok R. Subramanian, Cambridge, MA (US)

(73) Assignee: Aspen Technology, Inc., Bedford, MA (US)

( * ) Notice: Subject to any disclaimer, the term of this patent is extended or adjusted under 35 U.S.C. 154(b) by 873 days.

(21) Appl. No.: 13/931,715

(22) Filed: Jun. 28, 2013

(65) Prior Publication Data

US 2014/0330783 A1 Nov. 6, 2014

Related U.S. Application Data

(63) Continuation-in-part of application No. 13/875,680, filed on May 2, 2013, now Pat. No. 9,442,475.

(51) Int. Cl.
*G06F 17/50* (2006.01)
*G06F 17/30* (2006.01)

(52) U.S. Cl.
CPC .............. *G06F 17/30371* (2013.01)

(58) Field of Classification Search
CPC ....... G05B 17/02; G05B 13/04; G05B 13/048; G05B 13/027; G05B 19/0426; G05B 19/0428; G05B 19/41865; G05B 2219/23258; G05B 2219/23404; G05B 2219/23445; G05B 2219/31396; G05B 2219/32097; G06F 17/50; G06F 17/30371

USPC ............... 707/2; 709/251, 249; 714/4; 703/1
See application file for complete search history.

(56) References Cited

U.S. PATENT DOCUMENTS

| D403,673 S | 1/1999 | Arora et al. |
| D420,995 S | 2/2000 | Imamura et al. |
| D451,928 S | 12/2001 | Van Huong |
| D454,138 S | 3/2002 | Imamura et al. |
| D462,695 S | 9/2002 | Nguyen Van Huong |
| D500,766 S | 1/2005 | Hanisch et al. |
| D592,223 S | 5/2009 | Neuhaus |

(Continued)

OTHER PUBLICATIONS

Element (mathematics) defined, Archived definition dated Nov. 28, 2012 https://en.wikipedia.org/w/index.php?title=Element_(mathematics)&oldid=525288249.*

(Continued)

*Primary Examiner* — Dwin M Craig
*Assistant Examiner* — Scott S Cook
(74) *Attorney, Agent, or Firm* — Hamilton, Brook, Smith & Reynolds, P.C.

(57) ABSTRACT

The ability to perform non-destructive editing of files and models requires the generation and persistence of input deltas that capture changes that are made to a base starting point. Reconstitution of saved state may be achieved through the application of deltas. This capability is useful for failover remediation in client/server environments since the client has access to the deltas, such that in the event that a stateful service becomes unresponsive (and therefore, no longer available), the service may be taken offline and a new resource may be assigned as a replacement. In such an event, the service is directed to load the baseline data and any changes may be reapplied, restoring the service state.

23 Claims, 10 Drawing Sheets

(56) References Cited

U.S. PATENT DOCUMENTS

| | | | |
|---|---|---|---|
| D593,120 S | 5/2009 | Bouchard et al. | |
| D598,468 S | 8/2009 | Hirsch et al. | |
| D606,091 S | 12/2009 | O'Donnell et al. | |
| D607,007 S | 12/2009 | Kocmick | |
| 7,627,694 B2* | 12/2009 | Sreenivasan | H04L 69/40 709/249 |
| D614,192 S | 4/2010 | Takano et al. | |
| D624,928 S | 10/2010 | Agnetta et al. | |
| D628,584 S | 12/2010 | Umezawa | |
| D629,410 S | 12/2010 | Ray et al. | |
| D657,377 S | 4/2012 | Vance et al. | |
| D658,204 S | 4/2012 | Jones | |
| D660,313 S | 5/2012 | Williams et al. | |
| D661,369 S | 6/2012 | Nelson | |
| D674,405 S | 1/2013 | Guastella et al. | |
| D678,320 S | 3/2013 | Kanalakis, Jr. et al. | |
| D678,894 S | 3/2013 | Kanalakis, Jr. et al. | |
| D678,895 S | 3/2013 | Ebler et al. | |
| D681,663 S | 5/2013 | Phelan et al. | |
| D681,664 S | 5/2013 | Phelan et al. | |
| D681,667 S | 5/2013 | Phelan | |
| D682,293 S | 5/2013 | Kanalakis, Jr. et al. | |
| D682,847 S | 5/2013 | Gardner et al. | |
| D682,866 S | 5/2013 | Peters et al. | |
| D687,063 S | 7/2013 | Myung et al. | |
| D688,692 S | 8/2013 | Tanghe et al. | |
| D691,160 S | 10/2013 | Schupp et al. | |
| D694,257 S | 11/2013 | McKinley et al. | |
| D698,816 S | 2/2014 | Phelan et al. | |
| D699,746 S | 2/2014 | Pearson et al. | |
| D700,208 S | 2/2014 | Phelan et al. | |
| D704,207 S | 5/2014 | Lee et al. | |
| D704,733 S | 5/2014 | Jewitt | |
| D706,828 S | 6/2014 | Hollobaugh | |
| D709,077 S | 7/2014 | Jonsson et al. | |
| 8,788,068 B2 | 7/2014 | Kocis et al. | |
| D710,892 S | 8/2014 | Hollobaugh et al. | |
| D722,075 S | 2/2015 | Zhang et al. | |
| D726,214 S | 4/2015 | Wantland et al. | |
| D729,836 S | 5/2015 | Lee | |
| D730,388 S | 5/2015 | Rehberg et al. | |
| D730,394 S | 5/2015 | Bray | |
| D730,397 S | 5/2015 | Oh et al. | |
| D730,932 S | 6/2015 | Kim et al. | |
| D730,952 S | 6/2015 | Siboni et al. | |
| D731,521 S | 6/2015 | Heo et al. | |
| D731,525 S | 6/2015 | Myers | |
| 9,046,881 B2 | 6/2015 | Blevins et al. | |
| D737,299 S | 8/2015 | Hisada et al. | |
| D737,321 S | 8/2015 | Lee | |
| D750,123 S | 2/2016 | Subramanian et al. | |
| 9,354,776 B1 | 5/2016 | Subramanian et al. | |
| 9,442,475 B2 | 9/2016 | Subramanian et al. | |
| 2002/0194324 A1* | 12/2002 | Guha | H04L 12/2602 709/223 |
| 2009/0076681 A1 | 3/2009 | Yasue et al. | |
| 2010/0088654 A1 | 4/2010 | Henhoeffer | |
| 2010/0332273 A1 | 12/2010 | Balasubramanian et al. | |
| 2012/0029661 A1 | 2/2012 | Jones et al. | |
| 2013/0339100 A1* | 12/2013 | Warrick | G06Q 10/0637 705/7.36 |
| 2014/0267425 A1 | 9/2014 | Moll et al. | |
| 2014/0330542 A1 | 11/2014 | Subramanian et al. | |
| 2014/0379112 A1 | 12/2014 | Kocis et al. | |
| 2015/0244884 A1 | 8/2015 | Sensu et al. | |

OTHER PUBLICATIONS

Hughes_2009 (What is a Microsoft Failover Cluster Virtual Adapter anyway? Dated Feb. 13, 2009 downloaded from https://blogs.technet.microsoft.com/askcore/2009/02/13/what-is-a-microsoft-failover-cluste . . . ).*

Murthy_Aug. 15, 2012, Murthy, A., Apache Hadoop Yarn—Concepts and Applications downloaded from http://hortonworks.com/blog/apache-hadoop-yarn-concepts-and-applications/.*

Meeks_Mar. 30, 2012, Meeks, H., BPPM Self Monitoring Core Components—How-To Video Series, Mar. 30, 2012 downloaded from https://-ommunities.bmc.com/docs/DOC-18939.*

Pillai, et al., "Development of Supervisory Control and Data Acquisition system for Laboratory Based Mini Thermal Power Plant using LabVIEW," International Journal of Emerging Technology and Advanced Engineering, (ISSN 2250-2459, vol. 2, Issue 5, May 2012).

Hashiguchi, et al, "Wide-area Integrated SCADA System Designed to Improve Availability and Flexibility," Hitachi Review, vol. 60 (2011), No. 7, p. 399.

"AspenTech Announces Availability of aspenOne® V8 Process Optimization Software", Dec. 10, 2012, PDF downloaded from http://www.aspentech.com/_ThreeColumnLayout. aspx?pageid=2147485680&id=15032387367, (3 pages) on Mar. 11, 2014.

"Version 8.4 of aspenONE® Software Expands Activation Capability to Optimize Energy, Economics, and Heat Exchanger Designs", Nov. 25, 2013, PDF downloaded from http://www.aspentech.com/_ThreeColumnLayout.aspx?pageid=2147485680&id=15032390879, (3 pages) on Mar. 11, 2014.

U.S. Appl. No. 14/186,796, filed Feb. 21, 2014, "Applied Client-Side Service Integrations in Distributed Web Systems".

U.S. Appl. No. 14/101,216, filed Dec. 9, 2013, "Activated Workflow".

"New Assay Management Functionality in Aspen PIMS™ Software Optimizes Crude Purchasing Decisions and Increases Profitability," Aug. 27, 2012, PDF downloaded from http://www.aspentech.com/_ThreeColumnLayout.aspx?pageid=2147485680&id=15032386682, (2 pages) on Mar. 11, 2014.

U.S. Appl. No. 14/187,958, filed Feb. 24, 2014, "Achieving Stateful Application Software Service Behavior in Distributed Stateless Systems."

U.S. Appl. No. 29/550,221, filed Dec. 31, 2015, "Display Screen With Graphical User Interface."

Notice of Allowance and Fee(s) Due for U.S. Appl. No. 14/186,796, "Applied Client-Side Service Integrations in Distributed Web Systems," date mailed, Apr. 4, 2016.

Notice of Allowance and Fee(s) Due for U.S. Appl. No. 13/875,680, "Method and System to Unify and Display Simulation and Real-Time Plant Data for Problem-Solving," date mailed, Jun. 20, 2016

Mathur, Abhinav, "Failure Handling in YARN—Map Reduce v2," Jan. 30, 2013, 1 page.

Murthy, Arun, "Apache Hadoop YARN—Concepts and Applications," Hortonworks, Aug. 15, 2012, 13 pages.

Kumar Vavilapalli, Vinod, "Apache Hadoop YARN—ResourceManager," Hortonworks, Aug. 31, 2012, 12 pages.

Altair HyperStudy; 137 pp.; Sep. 2009; obtained from http://blog.altair.co.kr/wp-content/uploads/2011/03/hyperstudy_10-0.pdf.

"AspenTech Brings Search and High Performance Trending to Manufacturing Execution Systems with New Release of Aspen InfoPlus.21® Software", Mar. 6, 2012, PDF downloaded from http://www.aspentech.com/_ThreeColumnLayout.aspx?pageid=2147485680&id=15032385728, (2 pages) on Apr. 29, 2013.

"New Release of Aspen Plus® Software Delivers an Innovative New Interface and Opens Process Simulation to a Wider Range of New Users", Mar. 6, 2012, PDF downloaded from http://www.aspentech.com/_ThreeColumnLayout.aspx?pageid=2147485680&id=15032385734, (3 pages) on Apr. 29, 2013.

"New Release of Aspen PIMS™ and Aspen Petroleum Scheduler™ Software Improves Collaboration Between Refining Planners and Schedulers", Mar. 6, 2012, PDF downloaded from http://www.aspentech.com/_ThreeColumnLayout.aspx?pageid=2147485680&id=15032385732, (2 pages) on Apr. 29, 2013.

"New Release of aspenONE® Software Enables Process Engineers to Display Real-Time Data on Simulation Flowsheets for the First Time", May 14, 2012, PDF downloaded from http://www.

(56) References Cited

OTHER PUBLICATIONS aspentech.com/_ThreeColumnLayout.aspx?pageid=2147485680&id=15032386067, (2 pages) on Apr. 29, 2013.

* cited by examiner

METHOD AND SYSTEM FOR STATEFUL RECOVERY AND SELF-HEALING

RELATED APPLICATION(S)

This application is a continuation-in-part of U.S. application Ser. No. 13/875,680 filed on May 2, 2013. The entire teachings of the above application are incorporated herein by reference.

BACKGROUND OF THE INVENTION

Computer systems, including but not limited to both single-user and multiple-user client/server systems that include hardware and software components, have demanding change request requirements and failover requirements. Such computer systems apply to a variety of industries, including the process industry which is a demanding industry that goes through rigorous planning, designing, construction, and operating procedures. The process industry has extensive simulation and computing needs. In the process industry, plant conditions fluctuate all the time, and the plant also has multiple modes of operation, e.g. summer mode, winter mode; normal throughput, reduced or increased throughput; also different grades of product or a different feedstock require the plant to operate in a different mode. In the process industry, many process and plant model and file changes are required to support the demands of the process industry and fluctuating plant conditions. In such a dynamic environment that requires frequent changes to models and files, a method and system is needed that addresses failover situations gracefully so that changes are not lost.

SUMMARY OF THE INVENTION

The proposed approach applies non-destructive editing in software models and files. One advantage of the proposed approach is that non-destructive editing means that multiple users may make changes to the same file without having one user's changes overwrite another user's changes. This is accomplished by coding the plant processing software or simulator, such as aspenONE (Trademark of Assignee), to "remember" the changes that a given user makes to a model and stores those changes in a given user's account (of the invention system), where the changes do not affect the other users and all users have their own private set or sets of changes. In the preferred embodiment of the proposed approach, changes are private and the baseline model itself is preferably not changed. In one embodiment, a single user may merge or share his sets of changes to a model. In an alternative embodiment, users may merge or share changes to a model instead of employing a private change approach. A given user receives a copy of the other user's changes. In a given scenario, loading the original model file and reapplying the changes restores the user's state and lets the user pick up where the user left off. Recovery from a critical failure in a simulator is preferably similar to starting over where opening a saved simulation triggers the process software or simulator to pull the user's modifications from the user's account and applies the user's modifications to the baseline model, thereby restoring the state. In addition, additional unsaved changes (not saved in the user's account) held in computer memory (working memory generally) may be retrieved for the user and these unsaved changes are also included as part of the saved modification set.

Another advantage of the proposed approach includes an advanced concept of autonomous self-healing where the system components detect simulator failure conditions and take pro-active steps behind the scenes by assigning a new simulator. The system loads the data and reapplies the changes that were in effect when the failure occurred. In one embodiment of the proposed approach, this autonomous self-healing is performed before a user is aware of a problem with the simulator.

Another advantage of the proposed approach is an improved change management strategy compared to existing change management strategies. Existing change management strategies apply source control (such as Clearcase and CVS) to change files, through multiple users, and the file changes result in different versions of a baseline, that are stored in a repository. In existing systems, the latest baseline version of the file is comparable to a single source of truth. By contrast, the proposed approach provides multiple sources of truth where every user has an independent source of truth. In the proposed approach, individual user preferences and individual user changes are stored in user preference storage (or content storage) and each user may have his own source of truth. Rather than just saving a new baseline for each version, the proposed approach saves the changes relative to an initial/original user baseline, which is more convenient to the user.

Another advantage of the proposed approach is that it includes a user-centric focus. By contrast, in existing source control environments, the focus is repository-centric. The proposed approach includes a focus on the individual preferences and needs of the system developers. In the proposed approach, user deltas and user preferences are saved.

The proposed approach includes a computer-implemented method of managing data for a user group of at least one user comprising forming a set of change groups, made through a user interface by a given user of the user group, wherein a given change group of a set of change groups is associated with the given user of the user group, wherein the given user of the user group makes changes to a model, starting from a baseline that is retrieved from a storage group. The approach further includes storing the baseline in a shared file storage included in the storage group. The proposed approach further comprises storing, upon a save operation, a first set of changes from the given change group, to a user-authenticated content storage included in the storage group. The approach further comprises continuously tracking changes made after the save operation and storing both a remaining set of changes from the given change group, including the changes made after the save operation, and the first set of changes from the given change group, to a local memory included in the storage group.

The computer-implemented method may include the model being associated with an application instance and further comprising the following computer-implemented step: detecting a switchover event, through a resource manager, that identifies the application instance as an application instance identified for removal, through the resource manager communicating with an adapter associated with the application instance. The computer-implemented method may include the following computer-implemented steps: removing the association between the model and the application instance, through the resource manager; terminating the application instance identified for removal, as a result of a command sequence initiated by the resource manager, in parallel with the following steps; replacing the application instance identified for removal with a new application instance based upon a replacement initiation from the resource manager; associating the model with the new application instance, through the resource manager; and restoring to the new application instance, the given change group and the baseline, from the storage group, through a model restoration procedure initiated by the resource manager and implemented by the adapter.

The computer-implemented method may have the model including at least one file, a simulation model, or an application model. The computer-implemented method may include the adapter associated with the application instance intercommunicating with both the application instance and the resource manager, and the adapter may terminate, restart, or repair the application instance. The computer-implemented method may include a monitor that monitors both the adapter and the application instance and the monitor detects an additional switchover event and terminates the application instance. The computer-implemented method may include the adapter monitoring both the adapter and the application instance and the adapter detects an additional switchover event and terminates the application instance.

The computer-implemented method may include the switchover event including a failover event detected by a loss of one or more periodic heartbeat messages sent from the application instance to the resource manager. The computer-implemented method may include the switchover event resulting from an interrogation command sent from the resource manager to the application instance that fails to receive an expected acknowledgement. The computer-implemented method may include the switchover event including regular maintenance as administered by an administration dashboard.

The computer-implemented method may include the model being associated with a new application instance, in addition to being associated with the application instance, and subsequently after detecting the switchover event, the application instance is no longer associated with the model, thereby replacing the application instance identified for removal with the new application instance in a seamless manner, such that a live user service session is not interrupted or modified, wherein a redundant mirrored application instance is applied as the new application instance.

The computer-implemented method may include the given change group of the set of change groups being private such that it does not interfere with a set of remaining change groups from the set of change groups. The computer-implemented method may include the given change group of the set of change groups being merged with at least one change group of a set of remaining change groups from the set of change groups. The computer-implemented method may include the given change group of the set of change groups being shared with at least one change group of a set of remaining change groups from the set of change groups.

The proposed approach may include a computer system of managing data for a user group of at least one user comprising the following computer-implemented elements. A user interface that, through interaction with a given user of the user group, forms a change group of a set of change groups, wherein the given user of the user group makes changes to a model, starting from a baseline that is retrieved from a storage group, wherein the model is associated with an application instance. A shared file storage that stores the baseline included in the storage group; a user-authenticated content storage that stores, upon a save operation, a first set of changes from the given change group, and is included in the storage group. A local memory that is included in the storage group and continuously tracks changes made after the save operation and stores a remaining set of changes from the given change group including the changes made after the save operation, and the first set of changes from the given change group. A resource manager that detects a switchover event and identifies the application instance as an application instance identified for removal, through the resource manager communicating with an adapter associated with the application instance, and removes the association between the model and the application instance. The resource manager initiates a command sequence that results in termination of the application instance identified for removal, in parallel with the steps below: a new application instance replaces the application instance identified for removal based upon on a replacement initiation from the resource manager; and the resource manager associates the model with the new application instance and initiates a model restoration procedure, implemented by the adapter, that restores the given change group and the baseline to the new application instance.

The model of the computer system may include at least one file, a simulation model, or an application model. The computer system may include the adapter associated with the application instance intercommunicates with both the application instance and the resource manager, and the adapter may terminate, restart, or repair the application instance. A monitor may monitor both the adapter and the application instance and the monitor detects an additional switchover event and terminates the application instance, and the adapter monitors both the adapter and the application instance and the adapter detects the additional switchover event and terminates the application instance.

The computer system may include the switchover event including a failover event detected by a loss of one or more periodic heartbeat messages sent from the application instance to the resource manager, the switchover event results from an interrogation command sent from the resource manager to the application instance that fails to receive an expected acknowledgement, or the switchover event includes regular maintenance as administered by an administration dashboard. The computer system may include the model being associated with a new application instance, in addition to being associated with the application instance, and subsequently after detecting the switchover event, the application instance is no longer associated with the model, thereby replacing the application instance identified for removal with the new application instance in a seamless manner, such that a live user service session is not interrupted or modified, wherein a redundant mirrored application instance is applied as the new application instance.

The computer system may include the given change group of the set of change groups is private such that it does not interfere with a set of remaining change groups from the set of change groups, or the given change group of the set of change groups may be merged with or shared with at least one change group of a set of remaining change groups from the set of change groups.

The computer program product may include: one or more non-transitory computer-readable storage media having computer-executable components for use in managing information for a user group of at least one user, said computer-executable components comprising the following. A user interface that, through interaction with a given user of the user group, forms a change group of a set of change groups, wherein the given user of the user group makes changes to a model, starting from a baseline that is retrieved from a storage group, wherein the model is associated with an application instance. A shared file storage that stores the baseline included in the storage group; a user-authenticated content storage that stores, upon a save operation, a first set of changes from the given change group, and is included in the storage group; a local memory that is included in the storage group and continuously tracks changes made after the save operation and stores a remaining set of changes from the given change group including the changes made after the save operation, and the first set of changes from the given change group. A resource manager that detects a switchover event and identifies the application instance as an application instance identified for removal, through the resource manager communicating with an adapter associated with the application instance, and removes the association between the model and the application instance. The resource manager initiates a command sequence that results in termination of the application instance identified for removal, in parallel with the steps below: a new application instance replaces the application instance identified for removal based upon on a replacement initiation from the resource manager; and the resource manager associates the model with the new application instance and initiates a model restoration procedure, implemented by the adapter, that restores the given change group and the baseline to the new application instance.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

A description of example embodiments of the invention follows.

One of the strengths of Service Oriented Architectures is the ability to share application resources across many clients; that flexibility comes in part, from stateless service behavior. However, sometimes stateful service patterns are employed as part of a migration of single-user stateful software to a distributed paradigm or for other reasons. Non-destructive editing normally involves a baseline from which a user works and the system maintains a list of changes to that baseline, where a list of changes is preferably referred to as a delta. One disadvantage of existing methods is that loss of state is always possible as services may exhibit failure behavior including the following: stalling, slowing to a crawl or simply failing outright. The proposed approach detects at least this failure behavior, and adopts proactive steps by its intelligent self-healing systems. As the delta evolves, changes to the delta are written to persistent store.

Figure 1A:
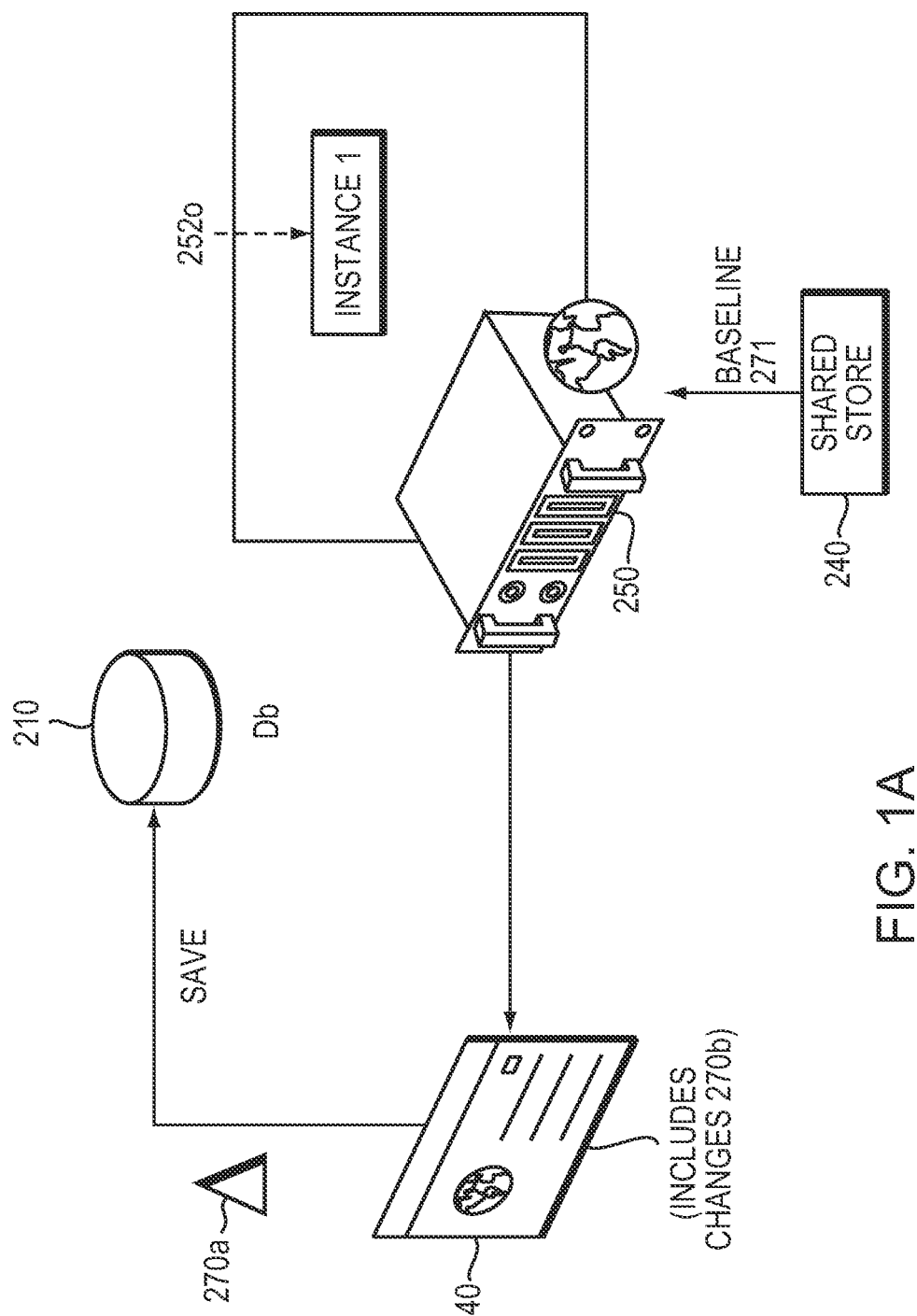
FIG. 1A is a schematic illustration of model changes being stored.

FIG. 1A is a representation of changes being stored to a model. At a high level, a model is associated with an application instance 252o that is stored inside of a Service Platform 250. Three types of data collectively form a model, including the baseline 271, and a set of changes (delta) 270 that includes a first set of changes (delta) 270a and a second set of changes (delta) 270b. The baseline model 271 is initially retrieved from a shared store 240. The baseline model 271 may be at least one file, a simulation model, or an application model that includes, but is not limited to, process control, planning, scheduling, manufacturing, accounting, manufacturing supply chain (MSC) products, supply chain logistics, anything that requires automation in a plant or process, anything that performs processing of crude oil, plant data, or other types. The baseline model 271 is displayed to the user through a client user interface 40 and the user may interact with and modify the baseline model 271, making changes (deltas 270 including at least 270a, 270b) to form a changed model. When a user performs a "save" operation then any deltas 270a are saved to a user preference storage service 210 (which also may include a content storage service). Local memory associated with the client 40 stores both the deltas 270a and any changes 270b made since the "save" operation.

Figure 1B:
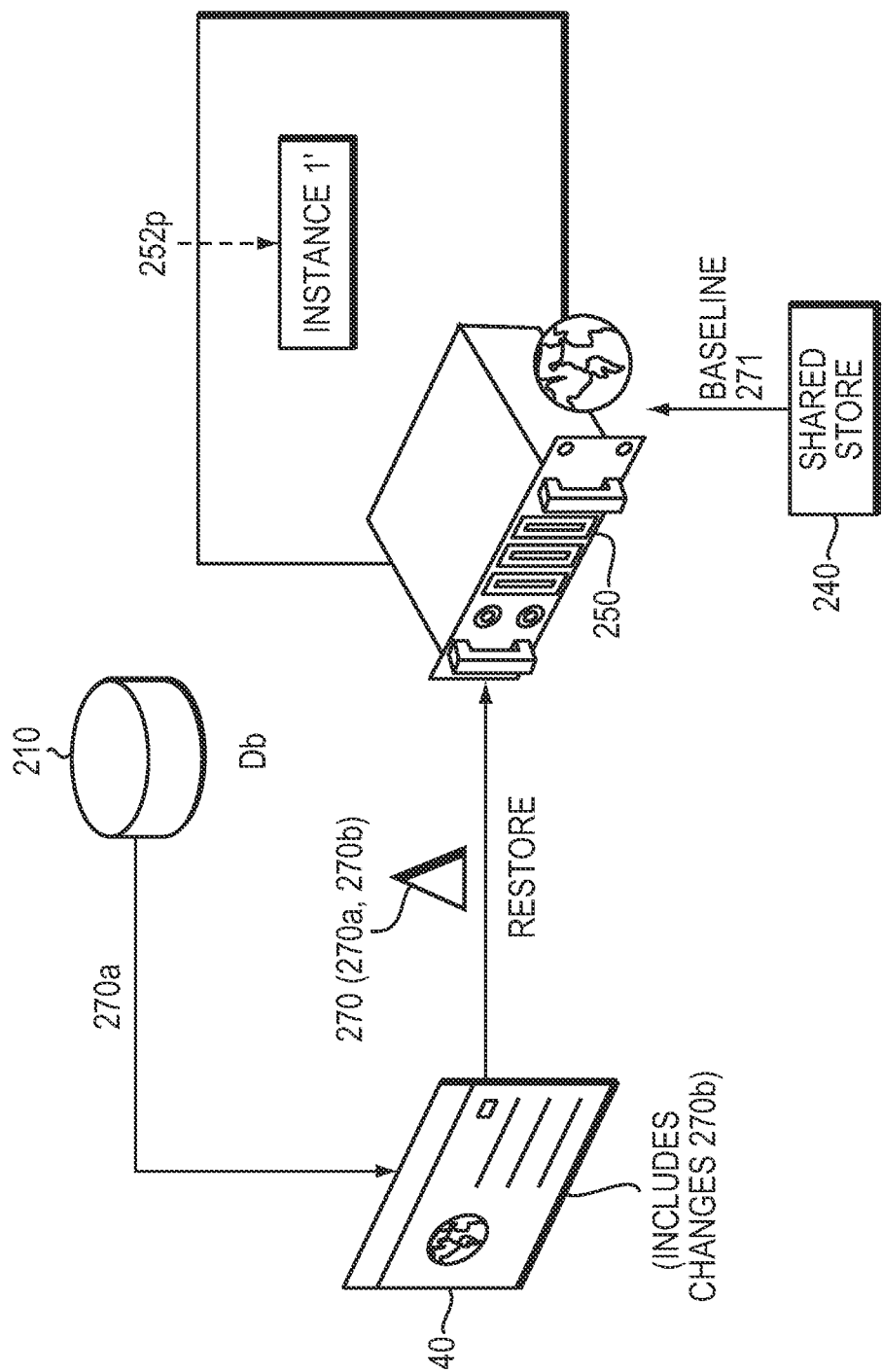
FIG. 1B is a schematic illustration of model changes from a session in FIG. 1A being restored in a subsequent session.

FIG. 1B is a representation of model changes from FIG. 1A being restored. As shown in FIG. 1B, restoration preferably includes restoration of the model and the cumulative deltas 270. A "restore" operation preferably includes creation of a new application instance 252p that has the characteristics of the old application instance 252o. The "restore" operation also transfers the entire model associated with the old application instance 252o to the new application instance 252p, including the saved baseline 271 from storage 240, the changes 270 including saved changes 270a, and any additional changes 270b since the last "save" operation that are stored on the memory associated with the client 40 and these changes are made through the user interface 40.

Some example situations where restoration is performed include, but are not limited to, the following. For example, restoration is performed if the application instance 252o becomes defunct and needs to be replaced by a replacement application instance 252p. In another example, the application instance 252o is brought down and restored later with 252p due to regular system maintenance. In yet another example, a user is working on a desktop at work, and then also wants to work later in the evening at home through a smart phone, so the user performs the "save" operation prior to (or by) closing out of the desktop application, and the user subsequently performs the "restore" operation by re-opening the application through the smart phone later in the evening.

Figure 1C:
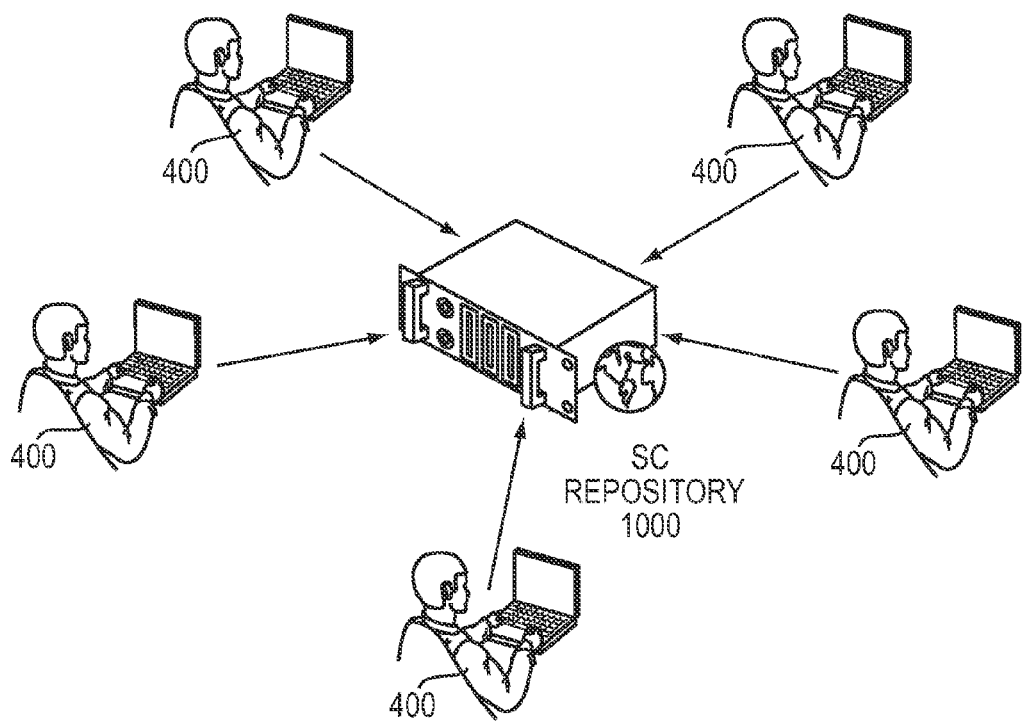
FIG. 1C is a schematic illustration of prior art source control systems.

As described earlier in the Summary, another advantage of the proposed approach is how it improves over the existing source control mechanisms. FIG. 1C is a representation of prior art source control systems. Normally, with source control systems, developers 400 work locally to directly/destructively modify a copy of the baseline code 271 that comes from a Source Control Repository 1000. The result is a set of one or more files that differ from what is stored in the repository. In this scenario, the repository constitutes the "single source of truth" for the code base. The changes that a developer makes are not persisted anywhere beyond the modifications to the files that exist locally; if the file gets deleted, it is considered acceptable as it is not perceived as having any significant value. This is a destructive edit scenario, where a system maintains a record of which destructive edits were made so that the states of the edited document may be reconstituted at any time. In such a system, any changes that are not stored in source control are deemed irrelevant.

In the prior art system of FIG. 1C, a key discriminator is that only one version of truth is allowed to exist at one time, and each version of that file requires an explicit checkin. At the time of checkin, the current version of the file is replaced by the new version of the file. Whether internally, it stores complete copies of the file or some subset of deltas is irrelevant since they represent a history only and none of those potential versions are allowed to exist at the same time along with the original baseline.

Figure 1D:
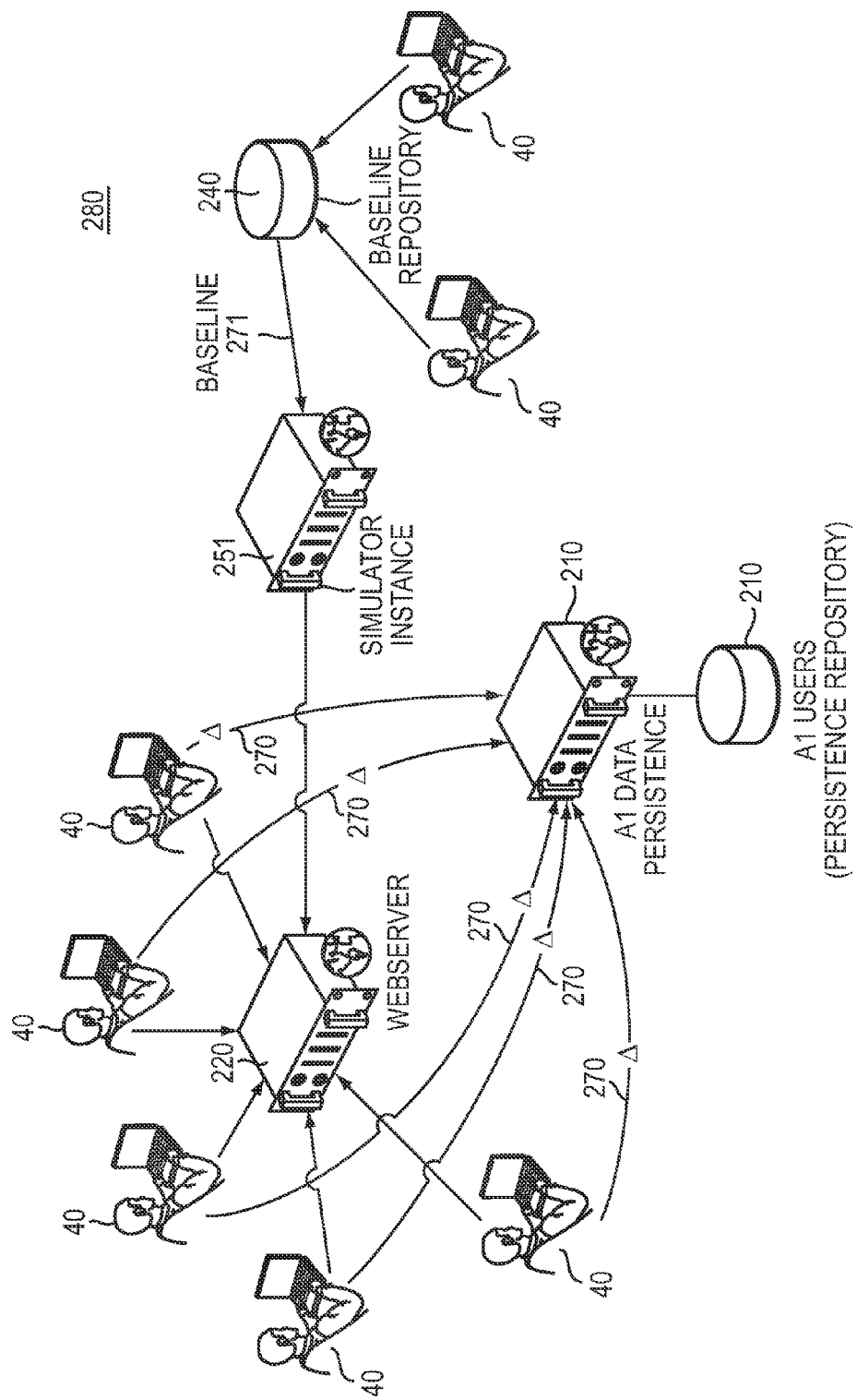
FIG. 1D is a schematic illustration of one aspect of the present invention and how it improves over FIG. 1C.

FIG. 1D is a representation of one aspect of Applicant's proposed approach and how it improves over FIG. 1C. In proposed approach, Applicant's system 280 content (e.g., aspenONE Trademark of Assignee) includes the baseline model files 271 which are created by desktop products of the proposed approach; these are stored in a network-visible location 240 that is part of the proposed approach but separate from the aspenONE (Trademark of Assignee) system. Access to this shared location allows for destructive editing by highly-skilled domain experts who are capable of building these complex models. Instead, the proposed approach allows users to perform non-destructive editing. On behalf of aspenONE (Trademark of Assignee) users, a simulator 251 reads a baseline file 271 and makes changes 270, and presents the baseline file 271 to the user 40 through a Web Server 220, but those changes are never saved back to the baseline repository 240. When a user wishes to persist the modifications to a model, the deltas 270 are taken from each user, when they initiate a save request and persist the delta information in a separate system 210 that is part of the aspenONE system and associates those changes with the user 40, not the baseline repository 240. To reinforce that this differs from a simple source control paradigm, these deltas are metadata that have a stronger relationship with the respective individual user than the model. This approach is so decoupled from the model that one may take the deltas and apply them to a different model and this may be performed regularly. The source control system of the prior art does not let one do that since it does not make sense in that paradigm. The baseline models 271 are preferably never modified by the normal non-destructive users 40; directly altering the baseline model 271 is performed by a user of the pertinent desktop applications (e.g., aspenONE Trademark of Assignee).

Figure 2A:
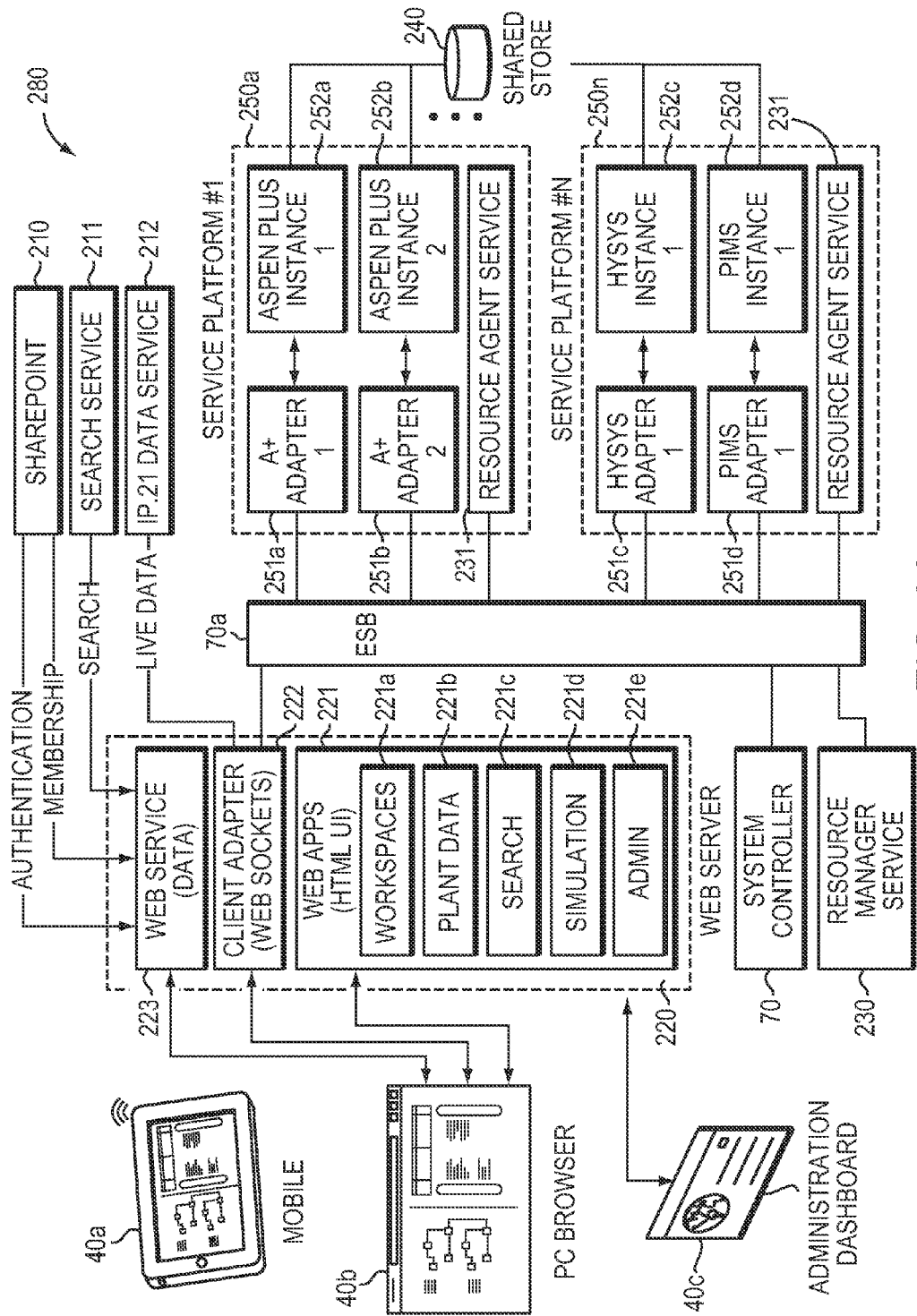
FIG. 2A is a schematic diagram of a preferred detailed architectural implementation of embodiments of the present invention.

FIG. 2A is a detailed architectural implementation diagram of a preferred embodiment (system 280). Each element in FIG. 2A may be implemented in software, hardware, or both, where each element is executed through computer processing means. Each element may either be in the same geographic location, or in a different geographic location compared with other elements. In FIG. 2A, each element may be either plural or singular.

The storage locations for each of the three model data types discussed above (270a, 270b, 271) are shown in FIG. 2A. The baseline model data 271 is stored in a Shared Store 240, the change data 270a on each "save" operation is stored in content storage 210 and locally in memory (preferably on the web server but not limited to that location) associated with the simulation web application 221d which is associated with the client 40, and the change data 270b made since each "save" operation is stored locally in memory associated with the simulation web application 221d which is associated with the client 40.

Heartbeat messages include regular messages that are emitted from a source to a system, to enable the system to identify if the source is no longer available. One example application of heartbeat messages is in Enterprise Systems. The resource manager 230 of FIG. 2A monitors heartbeat messages sent from each of the application instances 252 (where 252 includes at least 252a, 252b, 252c, 252d, 252o, and 252p) through an associated adapter 251 (where 251 includes at least 251a, 251b, 251c, and 251d) through an Enterprise Service Bus (ESB) 70a. These heartbeat messages are preferably sent every minute, although they may be sent more or less frequently, such as every five minutes, or faster than one minute. Typically, heartbeat messages are sent every minute, or faster.

In the event that one or more heartbeat messages is lost, or in the event of routine maintenance initiated by an administrator 40c, the resource manager 230 detects the failure and takes proactive steps by initiating a corresponding service recovery event, and takes the application service (250a for example) offline proactively and allocates another replacement (250n for example) from a pool of available services 250a . . . n. The client adapter 222 is notified that it needs to send the cached set of data deltas 270 to be applied to the baseline service after it has loaded the proper data and is ready to accept changes to its state. Applying the deltas 270 and baseline 271 effectively reconstitutes the state of the failed service. Referring to FIG. 2A, the client adapter 222 is requested to resend the changes in batch form, the user is aware that a failure and subsequent recovery has occurred. This capability of the proposed approach also allows a user to log into a system, reconstitute a stateful service and resume work that was previously stored in a non-destructive manner.

A subject application, for example, aspenONE (Trademark of Assignee), makes use of existing Aspen Plus (Trademark of Assignee) 252a, 252b, and HYSYS (Trademark of Assignee) 252c application instances by running them as Stateful Services; an instance of the application loads, which in turn, loads a specified model. In addition, other application instances may be used as stateful services, such as, but not limited to, PIMS (Trademark of Assignee) 252d, other application instances, simulation instances, data storage instances, data processing instances, data analysis instances, or other instance types. Applying user-specific deltas 270 and the baseline 271 to the application instance 252 effectively reconstitutes the state. Since these existing software products are not originally written to function as stateful services, an advantage of the proposed approach is that it makes up for this deficiency and accounts for failure events. Through the proposed approach, the subject application, like aspenONE (Trademark of Assignee), detects and ameliorates the impact of failure events in support of the user.

Some additional implementation details that support the proposed approach as shown in a preferred implementation in FIG. 2A are as follows. One of ordinary skill of the art understands that alternative methods for implementing the proposed approach may also be used. After discussion of these implementation details, a summary discussion is provided in reference to FIG. 2B.

As shown in FIG. 2A, the preferred Content Storage 210 implementation is Microsoft Sharepoint, however, embodiments of the proposed approach may also use other user preference storage (content storage) 210 implementations in place of Microsoft Sharepoint. The user preference storage 210 is preferably used to store user profile information, authentication information, and membership information, and models, files, or other data, however, one skilled in the art realizes that other types of storage may be used to store this information. User preference storage 210 is communicated to the user through a Web Service (Data) 223 to a computer display 40 for the user, where the Web Service may optionally be included in a Web Server 220. However, in an alternative embodiment, the Web Service (Data) 223 may be replaced by the Client Adapter 222 which communicates with the ESB 70a.

The computer displays 40 (where 40 at least also includes 40a, 40b, and 40c), shown in FIG. 2A, include but are not limited to a computer monitor, personal computer, laptop, desktop, phone, smart phone, mobile phone, projection device, or other computer (digital processing or computing) device. The user is provided with Web Applications that include User Interfaces (UI) 221 that allow the user to modify a model or file and include at least Workspaces 221a, Plant Data 221b, Search 221c, Simulation 221d, and Administration 221e, where the UIs may optionally be included in a Web Server 220. The UI is implemented in Hypertext Markup Language (HTML) but alternative implementations may be used. Workspaces 221a have a unified user interface that allows the user to store search results, store file changes, model changes, store snapshots of data, store merged views of files and models, modify files and models, and include files and models, such as, but not limited to, simulation models and application models.

A Search UI 221c allows the user to search, through a Search Service 211, for models and files. The Search Service 211 software extracts metadata from files and models and indexes that data into the search.

Optionally, sensors perform plant data measurements from plant assets and report the plant data measurements through plant data servers through, for non-limiting example, an Aspen InfoPlus.21 (IP.21 of Assignee) data service 212. The plant data, indicated as "Live Data" in FIG. 2A, includes live (real time) data, historical data, and other types of plant data. This plant data is provided to the Client Adapter (Web Sockets) 222, where the Client Adapter may optionally be included in a Web Server 220. As illustrated in FIG. 2A, plant data from the IP.21 Data Service 212 and simulation data from the Enterprise Service Bus (ESB) 70a are simultaneously input to the Client Adapter 222.

The simulation model, application model, or one or more files that has both a baseline and deltas 270 are received by the Client Adapter 222. The application model may include, but is not limited to, a model file or one or more files as consumed by HYSYS (Trademark of Assignee), Aspen Plus (Trademark of Assignee), PIMS (Trademark of Assignee), or other application types. The simulation model may include, but is not limited to, a combination of a baseline and a user's delta values, along with session meta-information about zoom and pan levels, which stream tables are open and the filter settings, and optionally other settings. The Client Adapter 222, on behalf of the user, requests an available application instance from the Resource Manager 230. This request is the result of applying an Application Service 250 to a model that the user is viewing in the Simulation Application 221d. If the Resource Manager 230 grants the request, based upon compatibility and availability, then access to an application instance in Application Services 250 is provided, and a further request is performed through the Enterprise Service Bus (ESB) Network Element 70a which forwards to the Application Services 250a ... 250n (generally 250) to obtain a application instance. Within one or more instances of Application Services 250, the application instance may include one or more instances of, for non-limiting example, Aspen Plus 252a, 252b, Aspen HYSYS (Hydro Carbon Simulation System) 252c, Process Information Management System (PIMS) 252d, or other types of applications or simulators. Multiple application instances 252 may have the same UI or separate UIs. In addition, a Resource Agent Service 231 starts and stops Adapters 251 (where 251 at least includes 251a, 251b, 251c, and 251d). The adapters 251 adapt application-specific settings and instructions between software languages. The adapters 251 are also used to provide a connectivity mechanism to the ESB 70a for a given instance of a simulator 252. When the application instance 252 and the corresponding adapter 251 are activated, then data such as models, files, or other data from the shared store 240 may be transferred through the ESB 70a to the Client Adapter 222. Once an application instance is established, the Client Adapter 222 has exclusive access to the application. Note, multiple applications may be used, such as HYSYS (Trademark by Assignee) and Aspen Plus (Trademark by Assignee), but this fact is transparent to the user. Based on request parameters and/or other input from Resource Manager 230 and Client Adapter 222, the system knows which type of application is required and automatically interacts with the correct one. Note, if a deployment does not have any HYSYS applications installed, the Application Service is preferably not seen in the dynamic service bar. The Aspen Service 250 sends replies and other messages to the Client Adapter 222 that the application 252 publishes for the client to read.

Note that data from the shared store 240 may include any user-driven data meant for sharing, including but not limited to files or models. Note that both the Application Services 250 and the data from the shared store 240 are not limited to simulation, and other types of applications 252 using other types of Application Services data from the shared store 240 may be used, such as, but not limited to, files, models, application models, process control, planning, scheduling, manufacturing, accounting, manufacturing supply chain (MSC) products, supply chain logistics, anything that requires automation in a plant or process, anything that performs processing of crude oil, or other types. In addition, as shown in FIG. 2A, multiple service-platform instances (modules) 250 may be used and multiple application instances 252 may be used. Aspen Plus 252a, 252b, and Aspen HYSYS 252c each provide a comprehensive process modeling system, and PIMS 252d provides a planning and optimization solution.

Figure 2B:
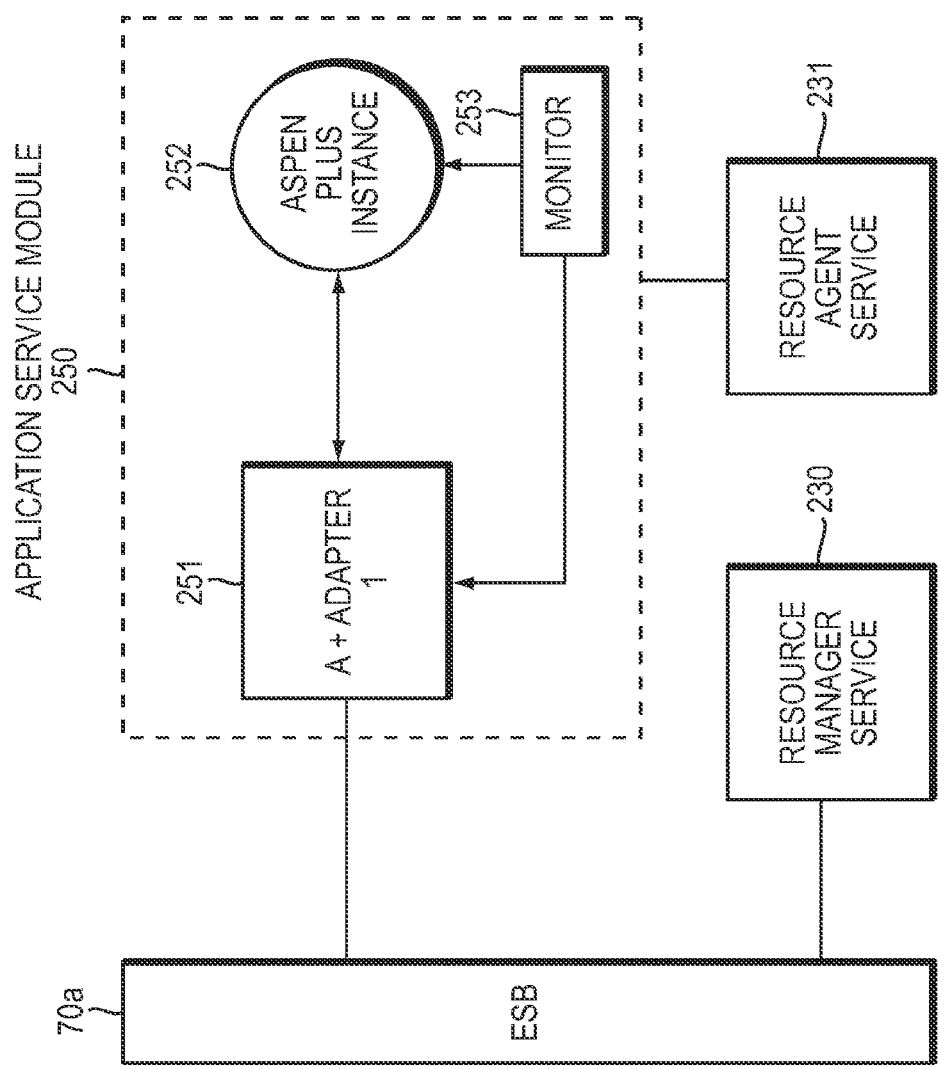
FIG. 2B is a schematic illustration of a monitor associated with the architecture of FIG. 2A.

Note also that the application instance may also include both the Adapter 251 and the corresponding Application Instance 252 and may optionally include a Monitor 253, as shown in FIG. 2B. The monitor 253 is connected to each adapter 251/application instance 252 pair, and the monitor 253 monitors both the application instance and the adapter. The monitor 253 may detect failures from either or both the adapter 251 and application instance 252, thereby serving as an additional self-healing mechanism. The monitor 253 triggers a switchover event in the case of a failure being detected in either the adapter 251 or the application instance 252.

Referring back to FIG. 2A, the application instance 252 has access to the Shared Store of simulation model information 240, so the Client Adapter 222 may retrieve simulation data. The Resource Agent 231 runs locally on an Application Service server (supports 250). The Resource Agent 231 starts and stops Adapters 251 (where 251 at least includes 251a, 251b, 251c, and 251d) based on configurations and commands, which may be changed at least at runtime. At startup, the Resource Agent 231 reads its configuration and starts the appropriate number of Adapters 251 which may be implemented as HYSYS Adapters, PIMS Adapters, Aspen Plus Adapters, and/or other types of Adapters. The Adapters 251 initialize and register with the Resource Manager 230. The Resource Agent 231 has a responsibility to kill/terminate (stop) any application service process (if tasked by the administrator) to keep the machine clear of hanging, slowing, or otherwise misbehaving service threads, or for other reasons. In one embodiment, the "Application" Service Lifecycle is designed to mimic the Desktop Lifecycle, although one skilled in the art may realize that other computer lifecycles may be used. As such, the Resource Adapter 251 is a proxy for the desktop user and starts and stops the respective application instance 252 to help ensure stability and to guard against side-effects.

The following is a further explanation of Resource Management from the Client View (generally at 40). To a system client 40, there is a mechanism for sharing a limited set of resources across a group of people where access is exclusive for the period of time that it is in use. This process works a lot like bowling. In order to bowl, a user needs shoes. Shoes are limited resources that require exclusive access; while the user is bowling, no one else may use shows that he is using. A representative assigns a pair of shoes in exchange for something a user wants back, like a driver's license (or system tokens in the present invention). When the user finishes, the user returns the shoes to a trusted third party, and after some housekeeping, the shoes (a resource) become available again and someone else may check them out. The system Web Application 221, the trusted third party is the Resource Manager 230 and the Resource Manager 230 oversees a system that is a bit more complex. Like a taxi cab dispatcher, the Resource Manager 230 knows how many cabs are available, how many have riders and how many are "out of service." Such systems are dynamic and may easily adjust if there are problems.

Figure 3:
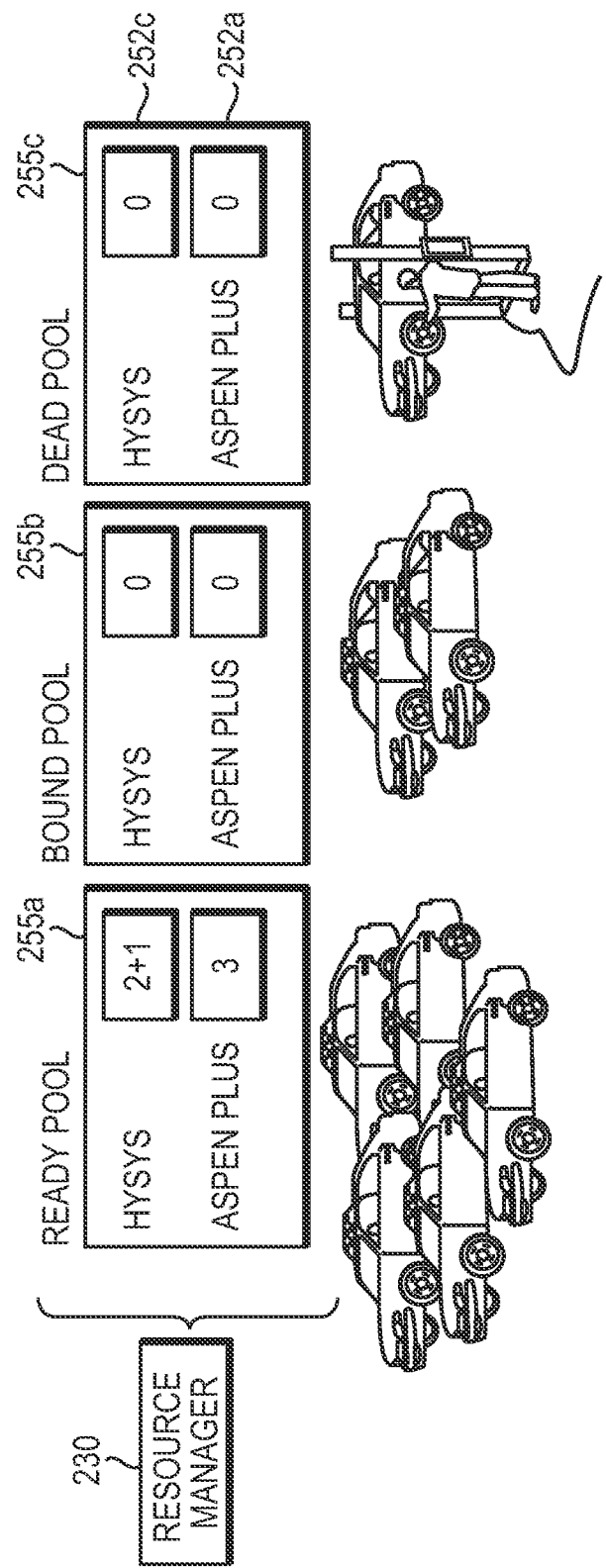
FIG. 3 illustrates a preferred embodiment of resource pools used by the present invention.

As shown in FIG. 3, the Resource Manager 230 manages a pool of resources that includes three classes of resource pools, a Ready Pool 255a, a Bound Pool 255b, and a Dead Pool 255c. The Ready Pool 255a includes application resources that are available but not yet in use, the Bound Pool 255b includes application resources that are in use, and the Dead Pool 255c includes application resources that are considered removed or otherwise defunct. Each resource pool class may be also considered as a state. Preferably, a resource may transition from a ready state to a bound state, from a bound state to a ready state, and from either a bound state or ready state to a dead state. However, in alternative embodiments other state transitions are allowed.

Referring back to FIG. 2A, the Resource Adapter 251 is a smart proxy and handles all system interaction on behalf of the respective Application Instance 252 on initialization, it registers the Service 250 with the Resource Manager 230. The Resource Manager 230 preferably does not require apriori knowledge of the Adapter 251. This high level of decoupling makes the proposed approach very dynamic and scalable.

The Resource Adapter 251 preferably services user requests after it has been assigned to a specific client; the assignment process is called "binding" and includes a binding ID that drives dynamic routing. The binding ID is held by both the client and the Adapter 251. A bound Resource Adapter 251 begins to receive user requests for processing and spins up an instance of the application 252, which checks out tokens. As with any other System Service 250, the Adapter 251 publishes responses, System Events and Notifications via messaging.

The Resource Adapter 251 functions as a proxy for the Service 250 and when not actively servicing requests, the Service 250 instance preferably does not exist. When the Application Instance 252 is brought into being by Adapter 251, communication occurs via a Case Execution Service (CXS). This pattern allows the Resource Adapter 251 to continue to participate in Automation, System Management and Administrative functions. The Adapter is a stand-alone system component, and like all components, it preferably provides regular status reports even if there is no application currently running Once connected to the backbone, the Resource Adapter 251 provides Service Access 250 by receiving requests, publishing events, responses and notifications on behalf of itself and the application instance. Adapter (251)/Application Instance (252) communication occurs via CXS which includes but is not limited to, an application programming interface (API). The Adapter 251 includes control logic and sends commands through the CXS to the Application Instance 252 to load, run, query, or otherwise handle the model.

Figure 2C:
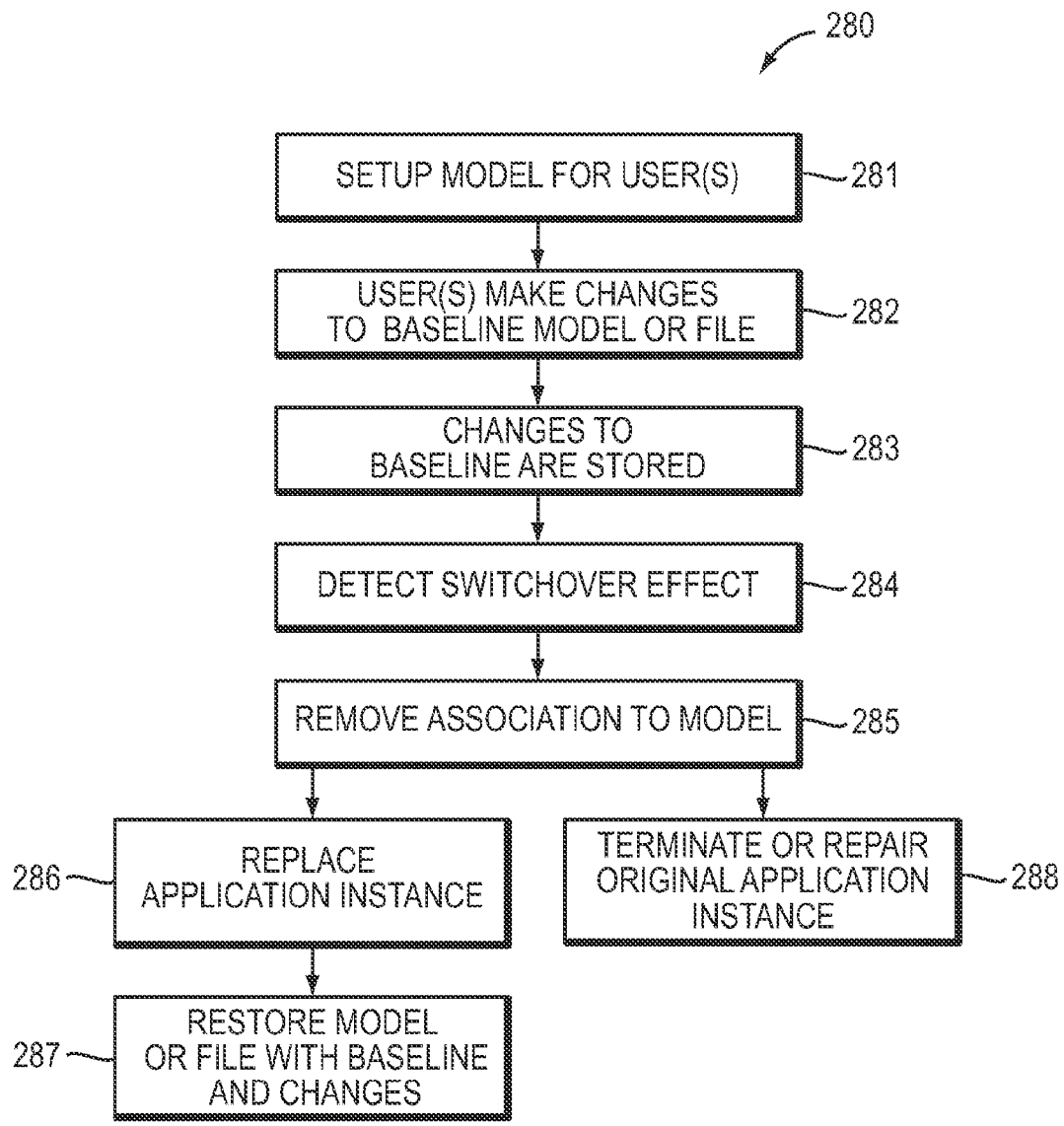
FIG. 2C is a procedural flowchart of the present invention of FIG. 2A.

Now that context of architectural elements and related terminology is described for FIG. 2A, a summary of a preferred embodiment of the proposed approach is provided in FIG. 2C. FIG. 2C is used for an illustration of the primary steps of a preferred embodiment/system 280 of the proposed approach.

In step 281 of FIG. 2C, the model (simulation model, application model, or one or more files) is setup for a given user. Initially, a baseline model 271 is added to the shared store 240, or the baseline model 271 is pre-existing in the shared store 240. The client adapter 222 requests a resource from the resource manager 230, the request is granted, an associated application adapter 251 is added to the bound pool, a binding ID is assigned from the resource manager 230 and held by the client adapter 222 and the adapter 251. An associated application instance 252 is established by a command from the adapter 251. Each application instance 252 is paired with an adapter 251 that controls the application instance 252 and handles communication between the application instance 252 and the client adapter 222, the resource manager 230, and the corresponding resource agent 231, as shown in FIG. 2A. The adapter 251 is between the application instance 252 and the client adapter 222, resource manager 230, and the resource agent 231, as shown in FIG. 2A. A bi-directional traffic communication path from the client adapter 222 to the application instance 252 is established through the ESB 70a connected to an adapter 251 that is coupled with the application instance 252 as shown in FIG. 2A. The resource manager 230 allows this bi-directional traffic communication path, thereby allowing an association between the application instance 252 and the model 271 at the client adapter 222. In a preferred embodiment, bi-directional traffic between the client adapter 222 and the application instance 252 passes through the resource manager 230 and the resource manager 230 acts as a gate for the bi-directional traffic, thereby allowing an association between the model at the client adapter 222 and the application instance 252. The application instance 252 retrieves the baseline model 271 from the shared store 240 and delivers this model for viewing to a given client adapter 222 through a given user interface 40.

In step 282, one or more users, each on different client adapters 222, each make different changes 270 to the same baseline model 271 through either the same or different user interfaces 40. One or more users may make changes through a given user interface 40 and a given client adapter 222, multiple user interfaces 40 with a single client adapter 222, or multiple user interfaces 40 with multiple client adapters 222. One or more users may have access to the same baseline model 271 either through the same application instance 252 or different application instances (252a and 252c for example).

In step 283, changes are saved. In an alternative embodiment, the baseline 271 may be modified directly and saved to the shared store 240 with changes. However, in a preferred embodiment, the baseline 271 is preferably not modified in the shared store 240. For a given user, the first set of changes 270a to the baseline model is saved, upon a save operation, to a user-authenticated user preference storage 210 (also known as content storage) and locally within the simulation web application 221d on the web server 220 (and preferably to hardware memory on the web server). For a given user, a second set of changes 270b is saved locally to the simulation web application 221d, including any changes made since the last save operation. Multiple changes 270a, 270b, may be saved for either individual users or multiple users, using the same or different user preference storage 210 and the same or different client adapter 222 and the same or different user interfaces 40. In the preferred embodiment of the invention, changes are private and a given user may not overwrite the changes of another given user. In another embodiment, a single user or multiple users may merge changes, share changes, and share copies of changes, where changes include single changes, multiple changes, single sets of changes, or multiple sets of changes, including both changes 270a saved through one or more save operations, and changes 270b since the one or more save operations. At a given user interface 40, a given user may view another set of the given user's changes, or view another user's changes (both changes 270a and 270b) and choose to merge zero or more of these changes. In an alternative embodiment, a user may also store changes to a baseline model, directly to the shared store 240, although saving changes to shared store 240 is not the preferred approach.

In step 284, the resource manager 230 listens for, and detects a loss a periodic heartbeat message from an application instance 252, triggering a switchover event (which may include a failover event) that identifies the application instance 252 as a suspect or failed application instance for removal. Reasons for a switchover event include, but are not limited to, failover, loss or delay of one or more heartbeat messages, proactive failure detection, regular, routine, or non-routine maintenance, through an administration dashboard 40c either manually through a user or through an automatic process, or through a combination of automatic process and manual intervention. A switchover event may also result through other means, or other suspicious behavior detected by the resource manager 230 as reported to the resource manager 230 in the form of software messages or hardware control signals across the ESB 70a. A switchover event may also result from an optional interrogation command sent from the resource manager 230 to the application instance 252 and then the resource manager 230 fails to receive a corresponding expected acknowledgement from the application instance 252.

Additionally, in step 284, the resource manager 230 may detect one or more switchover events either simultaneously or at different times. The resource manager 230 uses the associated binding ID(s) and identifies any potentially suspect or failed application instance(s) 252 for subsequent repair or removal. In one embodiment, a monitor 253 is connected to each adapter 251/application instance 252 pair, and the monitor monitors both the application instance and the adapter and the monitor may detect failures from either or both the adapter 251 and application instance 252, thereby serving as an additional self-healing mechanism. The monitor 253 triggers a switchover event in the case of a failure being detected. The monitor 253 may be implemented as a transient thread object created by the adapter 251, to watch the adapter 251 and the instance 252 that it created, or, alternatively, the monitor 253 may be created by other means. The monitor may exit after completing its monitoring task. In another embodiment, detection is achieved, and a corresponding switchover event is achieved, through an adapter 251 which determines suspect behavior within itself or within an associated application instance 252, for example, if a the associated application instance 252 is unable to start up successfully, and the adapter communicates the failure to the resource manager 230 and either takes itself offline or attempts to restart the application instance. In the event that the adapter 251 takes itself offline, the resource agent 231 recognizes the adapter going offline, and restarts a new adapter because the resource agent 231 ensures that the number of running adapters matches a configuration.

In step 285, for each given failed application instance, the system 280 removes the association between the model and the application instance (for example 252a). As mentioned earlier, the resource manager 230 acts as a gate allowing an association between the model at the client adapter 222 and the application instance 252. In step 285, the association between the model at the client adapter 222 and the identified failed or suspect application instance (for example 252a) is removed, through the resource manager 230. Furthermore, when a switchover event is detected, the resource manager 230 sends commands to the respective corresponding resource agent 231 that it is taking a given adapter 251/application instance 252 pair out of the resource pool. In a preferred embodiment, in a following parallel step 288, the resource agent 231 attempts to repair, kill, or kill and restart the failed application instance.

In step 286, the system 280 selects a replacement application (for example 252b with associated adapter 251b) to replace the identified failed application instance (for example 252a with associated adapter 251a): this is one method of self-healing. The resource manager preferably uses the same binding ID for the new application instance (for example 252b) as was used for the failed application instance (for example 252a), and the client 40 is unaware of the restoration process. In alternative embodiments, a different binding ID is used. In a preferred embodiment, the original application instance 252a is killed and restarted for future use (self-healing) in step 288, and in parallel in step 286 the resource manager 230 switches the client 40 over to a new adapter 251b/application instance 252b pair from the ready pool to avoid delays impacting the user for restarting the application instance 252a.

Additionally, in step 286, in one embodiment, the resource manager initiates a seamless migration sequence, whereby the model is restored to a new replacement application (for example 252b) and an associated adapter (for example 251b) without any disruption, interruption, modification, or negative effect to the given user's live service session. The seamless migration sequence involves replacement to the client 40 with a new application instance (for example 252b) and removal of a suspect application instance (for example 252a). The seamless migration sequence includes, but is not limited to, session replication, mirroring, redundancy, or redundant mirroring for application instances 252, including, but not limited to, a plurality of adapter 251/application 252 pairs. The step 285 process results in a new application instance (for example 252b) available which replaces the failed application instance (for example 252a). In an alternative embodiment, an application instance repair or a kill and restart is performed as part of step 286, for example, if no additional adapter 251/application instance 252 pairs are available.

In step 287, now that the given replacement application (for example 252b) is setup, the given model is restored into the new given application instance (for example 252b) and the new given application instance with the given model allows access to the user client 40. The client 40, which is disassociated with the original failed application instance (for example 252a) due to step 285, is now associated with the new replacement application instance (for example 252b), as allowed by the resource manager 230 (which acts as a gate as described above). Furthermore, for a given user, the model (or file) is restored by retrieving the baseline 271 from a shared store 240, retrieving the changes or set of changes due to the save operation(s) 270a, from the user preference storage 210 or storage for the web server simulation web application 221d, and retrieving the changes or set of changes since the save operation(s) 270b that are stored on the client 40 and locally in the web simulation application on the web server 221d. If the client 40 has shut down and restarted, for example, in a scenario where a user logs off at one physical location, and logs on at another physical location at a later time, then the changes 270b are restored from the user preference storage 210, the baseline 271 is restored from the shared store 240, and the baseline 271 and changes 270b are restored both to the new application instance (for example 252b) and to the client 40. If the local client 40 is still running, then the changes 270a, 270b, are restored from the simulation web application 221d, and the baseline 271 is restored from the shared store 240, and the baseline 271 and changes 270a, 270b are restored to the new application instance (for example 252b) and the baseline 271 is restored to the client 40. The restoration occurs through a restoration procedure initiated by the resource manager 230.

Next, in step 288, the resource agent 231 chooses to repair, kill/terminate (preferably), restart, or kill/terminate and restart the failed application instance while the resource manager 230 selects a new application instance. When the resource agent 231 decides, then it notifies the adapter 251 to perform the repair, termination (preferable), restart, or kill/terminate and restart. If the adapter 251 is unavailable or unresponsive, the resource agent 231 may notify the monitor 253 to terminate the application instance 252. In step 288, when the adapter 251/application instance 252 pair is successfully repaired or restarted then it re-enters the resource manager's ready pool, and this repair and restart is done in parallel with (asynchronously from) the resource manager 230 obtaining the new application instance (for example 252b) in step 286. In a preferred embodiment, repair is not attempted and replacement is performed. In an alternative embodiment, the original application instance (for example 251a) is killed and restarted, so the new application instance 251a is associated with the same adapter 252a as the original application instance 251a, and has the same adapter 251a/application instance 252a pair as the original application instance.

Figure 4:
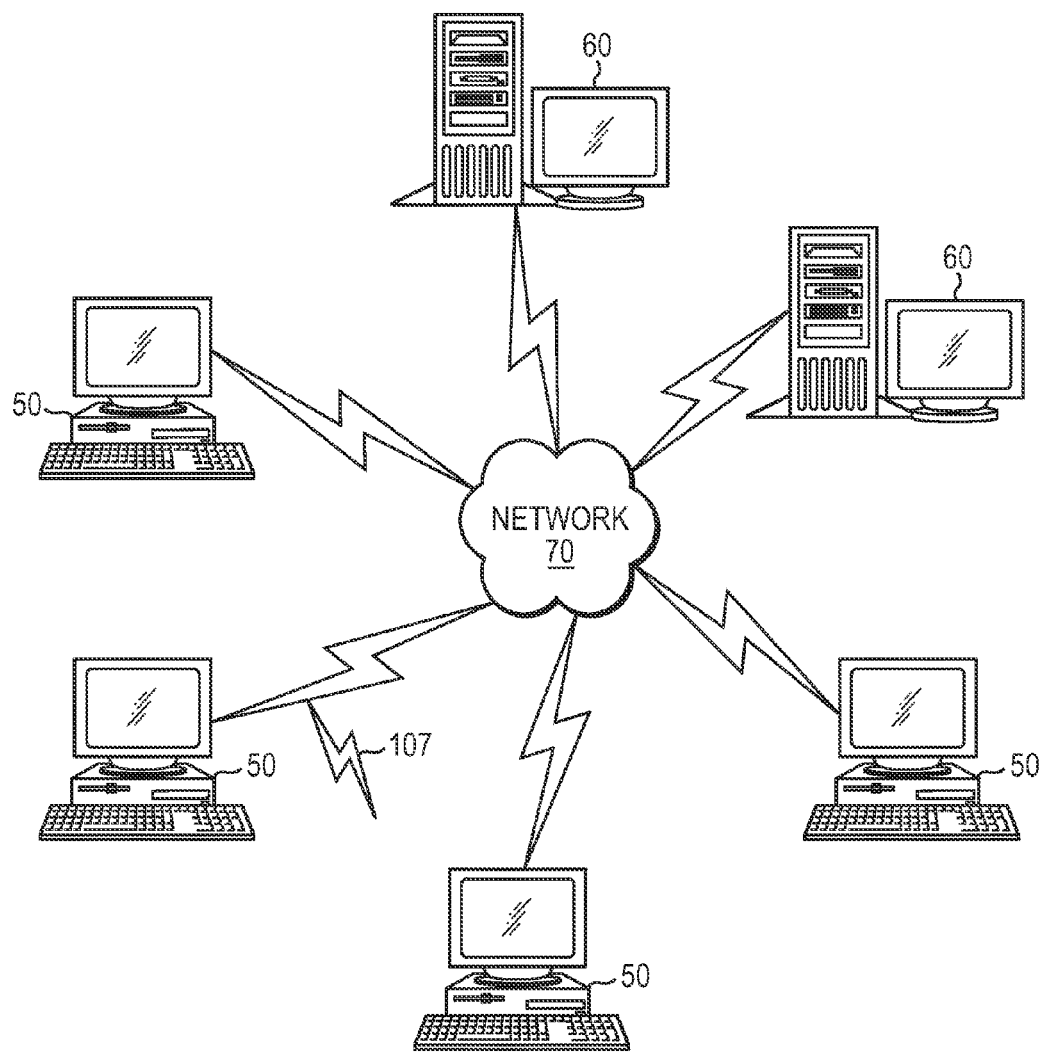
FIG. 4 illustrates a computer network or similar digital processing environment in which the present invention may be implemented.

FIG. 4 illustrates a computer network or similar digital processing environment in which the proposed approach may be implemented.

Client computer(s)/devices 50 and server computer(s) 60 provide processing, storage, and input/output devices executing application programs and the like. Client computer(s)/devices 50 may also be linked through communications network 70 to other computing devices, including other client devices/processes 50 and server computer(s) 60. Communications network 70 may be part of a remote access network, a global or local network (e.g., the Internet), a worldwide collection of computers, Local area or Wide area networks, and gateways that currently use respective protocols (TCP/IP, Bluetooth, etc.) to communicate with one another. Other electronic device/computer network architectures are suitable.

Figure 5:
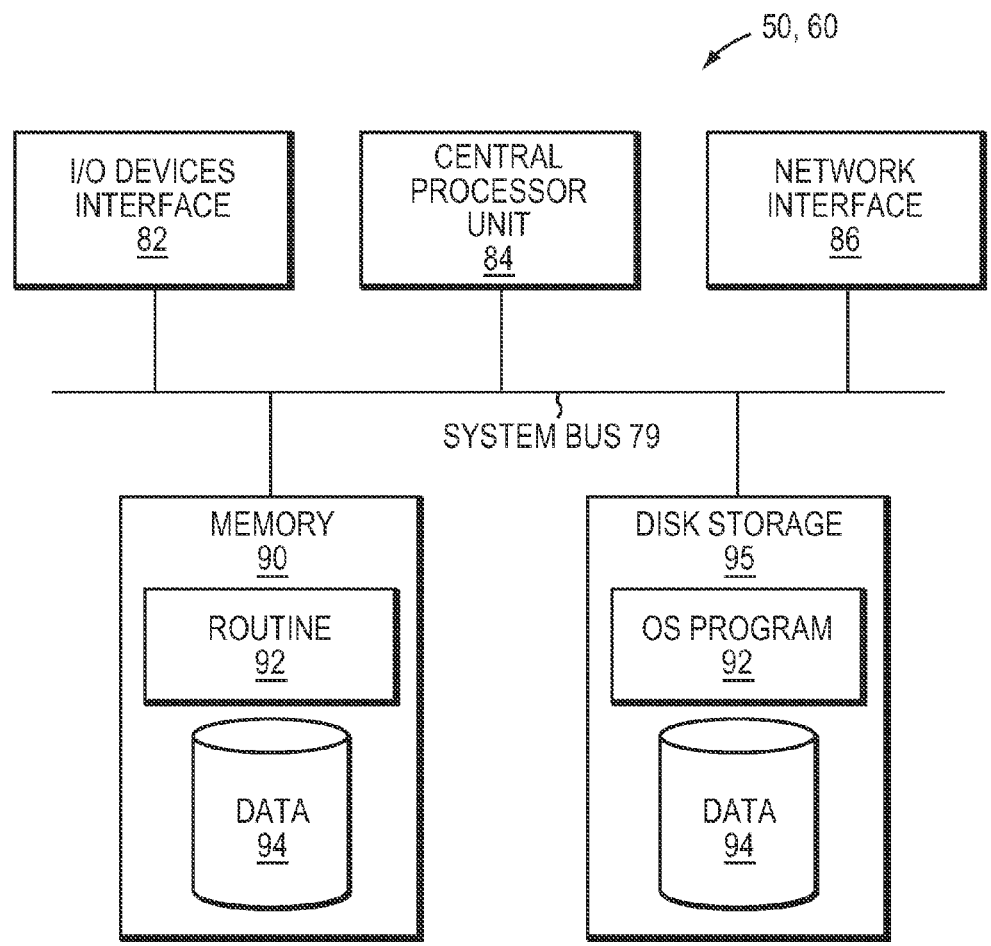
FIG. 5 is a block diagram of the internal structure of a computer in the computer network of FIG. 4.

FIG. 5 is a diagram of the internal structure of a computer (e.g., client processor/device 50 or server computers 60) in the computer system of FIG. 4. Each computer 50, 60 contains system bus 79, where a bus is a set of hardware lines used for data transfer among the components of a computer or processing system. Bus 79 is essentially a shared conduit that connects different elements of a computer system (e.g., processor, disk storage, memory, input/output ports, network ports, etc.) that enables the transfer of information between the elements. Attached to system bus 79 is I/O device interface 82 for connecting various input and output devices (e.g., keyboard, mouse, displays, printers, speakers, etc.) to the computer 50, 60. Network interface 86 allows the computer to connect to various other devices attached to a network (e.g., network 70 of FIG. 4). Memory 90 provides volatile storage for computer software instructions 92 and data 94 used to implement an embodiment of the proposed approach (e.g., code detailed above). Disk storage 95 provides non-volatile storage for computer software instructions 92 and data 94 used to implement an embodiment of the proposed approach. Central processor unit 84 is also attached to system bus 79 and provides for the execution of computer instructions.

In one embodiment, the processor routines 92 and data 94 are a computer program product (generally referenced 92), including a computer readable medium (e.g., a removable storage medium such as one or more DVD-ROM's, CD-ROM's, diskettes, tapes, etc.) that provides at least a portion of the software instructions for the invention system. Computer program product 92 may be installed by any suitable software installation procedure, as is well known in the art. In another embodiment, at least a portion of the software instructions may also be downloaded over a cable, communication and/or wireless connection. In other embodiments, the invention programs are a computer program propagated signal product 107 embodied on a propagated signal on a propagation medium (e.g., a radio wave, an infrared wave, a laser wave, a sound wave, or an electrical wave propagated over a global network such as the Internet, or other network(s)). Such carrier medium or signals provide at least a portion of the software instructions for the proposed approach routines/program 92.

In alternate embodiments, the propagated signal is an analog carrier wave or digital signal carried on the propagated medium. For example, the propagated signal may be a digitized signal propagated over a global network (e.g., the Internet), a telecommunications network, or other network. In one embodiment, the propagated signal is a signal that is transmitted over the propagation medium over a period of time, such as the instructions for a software application sent in packets over a network over a period of milliseconds, seconds, minutes, or longer. In another embodiment, the computer readable medium of computer program product 92 is a propagation medium that the computer system 50 may receive and read, such as by receiving the propagation medium and identifying a propagated signal embodied in the propagation medium, as described above for computer program propagated signal product.

Generally speaking, the term "carrier medium" or transient carrier encompasses the foregoing transient signals, propagated signals, propagated medium, storage medium and the like.

While this invention has been particularly shown and described with references to example embodiments thereof, it will be understood by those skilled in the art that various changes in form and details may be made therein without departing from the scope of the invention encompassed by the appended claims.

What is claimed is:

1. A computer-implemented method of managing process plant switchover data for a user group of at least one user comprising:
    a. forming a set of change groups, made through a user interface by a given user of the user group, wherein a given change group of a set of change groups is associated with the given user of the user group, wherein the given user of the user group makes changes to a model, starting from a baseline that is retrieved from a storage group, and the model is associated with an application instance;
    b. storing the baseline in a shared file storage included in the storage group;
    c. storing, upon a save operation, a first set of changes from the given change group, to a user-authenticated content storage included in the storage group;
    d. continuously tracking changes made after the save operation;
    e. storing both a remaining set of changes from the given change group, including the changes made after the save operation, and the first set of changes from the given change group, to a local persistent memory included in the storage group; and
    f. detecting a switchover event, through a resource manager that identifies the application instance as an application instance identified for removal, the resource manager communicating with an adapter paired with the application instance;
    the adapter intercommunicating with both the application instance and the resource manager, the adapter performing one or more of terminating, restarting, or repairing the application instance asynchronously with respect to the resource manager obtaining a new application instance, the adapter monitoring both the adapter itself and the application instance, and the adapter detecting an additional switchover event and terminating the application instance in response to said detecting the additional switchover event.

2. The method of claim 1, further comprising the following computer-implemented steps after step f:
    g. removing the association between the model and the application instance, through the resource manager;
    h. terminating the application instance identified for removal, as a result of a command sequence initiated by the resource manager, in parallel with the following steps;
    i. replacing the application instance identified for removal with a new application instance based upon a replacement initiation from the resource manager;
    j. associating the model with the new application instance, through the resource manager; and
    k. restoring to the new application instance, the given change group and the baseline, from the storage group, through a model restoration procedure initiated by the resource manager and implemented by the adapter.

3. The method of claim 2 wherein the model includes at least one file, a simulation model, or an application model.

4. The method of claim 2 wherein the switchover event is in response to a loss of one or more periodic heartbeat messages sent from the application instance to the resource manager, the loss of the one or more periodic heartbeat messages initiating the model restoration procedure.

5. The method of claim 2 wherein the switchover event results from an interrogation command sent from the resource manager to the application instance that fails to receive an expected acknowledgement.

6. The method of claim 2 wherein the switchover event includes regular maintenance as administered by an administration dashboard.

7. The method of claim 2 wherein the given change group of the set of change groups is private such that it does not interfere with a set of remaining change groups from the set of change groups.

8. The method of claim 2 wherein the given change group of the set of change groups may be merged with at least one change group of a set of remaining change groups from the set of change groups.

9. The method of claim 2 wherein the given change group of the set of change groups may be shared with at least one change group of a set of remaining change groups from the set of change groups.

10. The method of claim 1 wherein the model is also associated with the new application instance, in addition to being associated with the application instance, and subsequently after detecting the switchover event, the application instance is no longer associated with the model, thereby replacing the application instance identified for removal with the new application instance in a seamless manner, such that a live user service session is not interrupted or modified, wherein a redundant mirrored application instance is applied as the new application instance.

11. The method of claim 1, wherein the adapter provides, to the application instance, live plant data and simulation model data associated with the model.

12. The method of claim 1, wherein the resource manager detects the switchover event and the additional switchover event simultaneously.

13. The method of claim 1, wherein the resource manager detects the switchover event and the additional switchover event based upon one or more messages received through an enterprise service bus.

14. The method of claim 1, wherein the resource manager detects the switchover event and the additional switchover event based upon one or more control signals received through an enterprise service bus.

15. The method of claim 1, wherein the adapter adapts application-specific settings and instructions between logical entities and provides connectivity to an enterprise service bus for the application instance.

16. A computer system of managing process plant switchover data for a user group of at least one user comprising the following computer-implemented elements: a user interface that, through interaction with a given user of the user group, forms a change group of a set of change groups, wherein the given user of the user group makes changes to a model, starting from a baseline that is retrieved from a storage group, wherein the model is associated with an application instance;

A shared file storage that stores the baseline included in the storage group; a user-authenticated content storage that stores, upon a save operation, a first set of changes from the given change group, and is included in the storage group; a local persistent memory that is included in the storage group and continuously tracks changes made after the save operation and stores a remaining set of changes from the given change group including the changes made after the save operation, and the first set of changes from the given change group;

A resource manager that detects a switchover event and identifies the application instance as an application instance identified for removal, through the resource manager communicating with an adapter paired with the application instance, and removes the association between the model and the application instance;

The adapter intercommunicating with both the application instance and the resource manager, the adapter performing one or more of terminating, restarting, or repairing the application instance asynchronously with respect to the resource manager obtaining a new application instance, the adapter monitoring both itself and the application instance, and the adapter detecting an additional switchover event and terminating the application instance in response to said detecting the additional switchover event.

17. The computer system of claim 16 wherein the model includes at least one file, a simulation model, or an application model.

18. The computer system of claim 16 wherein
the resource manager initiates a command sequence that results in termination of the application instance identified for removal, in parallel with:
the new application instance replacing the application instance identified for removal based upon on a replacement initiation from the resource manager; and
the resource manager associating the model with the new application instance and initiates a model restoration procedure, implemented by the adapter, that restores the given change group and the baseline to the new application instance.

19. The computer system of claim 18 wherein the switchover event is in response to a loss of one or more periodic heartbeat messages sent from the application instance to the resource manager, the loss of the one or more periodic heartbeat messages initiates the model restoration procedure, and the switchover event results from an interrogation command sent from the resource manager to the application instance that fails to receive an expected acknowledgement, or the switchover event includes regular maintenance as administered by an administration dashboard.

20. The computer system of claim 16 wherein the model is also associated with the new application instance, in addition to being associated with the application instance, and subsequently after detecting the switchover event, the application instance is no longer associated with the model, thereby replacing the application instance identified for removal with the new application instance in a seamless manner, such that a live user service session is not interrupted or modified, wherein a redundant mirrored application instance is applied as the new application instance.

21. The computer system of claim 16 wherein the given change group of the set of change groups is private such that it does not interfere with a set of remaining change groups from the set of change groups, or the given change group of the set of change groups may be merged with or shared with at least one change group of a set of remaining change groups from the set of change groups.

22. A computer program product comprising: one or more non-transitory computer-readable storage media having computer-executable components for use in managing process plant switchover information for a user group of at least one user said computer-executable components comprising: a user interface that, through interaction with a given user of the user group, forms a change group of a set of change groups, wherein the given user of the user group makes changes to a model, starting from a baseline that is retrieved from a storage group, wherein the model is associated with an application instance; a shared file storage that stores the baseline included in the storage group; a user-authenticated content storage that stores, upon a save operation, a first set of changes from the given change group, and is included in the storage group; a local memory that is included in the storage group and continuously tracks changes made after the save operation and stores a remaining set of changes from the given change group including the changes made after the save operation, and the first set of changes from the given change group; a resource manager that detects a switchover event and identifies the application instance as an application instance identified for removal, through the resource manager communicating with an adapter paired with the application instance, and removes the association between the model and the application instance; the adapter intercommunicating with both the application instance and the resource manager, the adapter performing one or more of terminating, restarting, or repairing the application instance asynchronously with respect to the resource manager obtaining a new application instance, the adapter monitoring both itself and the application instance, and the adapter detecting an additional switchover event and terminating the application instance in response to said detecting the additional switchover event.

23. The computer program product of claim 22, wherein:
the resource manager initiates a command sequence that results in termination of the application instance identified for removal, in parallel with the steps below:
a new application instance replaces the application instance identified for removal based upon on a replacement initiation from the resource manager; and
the resource manager associates the model with the new application instance and initiates a model restoration procedure, implemented by the adapter, that restores the given change group and the baseline to the new application instance.

* * * * *